United States Patent [19]
Zion

[11] Patent Number: 5,122,018
[45] Date of Patent: Jun. 16, 1992

[54] HIGH PRODUCTIVITY KEY CUTTING MACHINE

[76] Inventor: Alfred Zion, 4590 Miller Ave., Montreal, Quebec, Canada, H-3 W-2 .E3

[21] Appl. No.: 733,326

[22] Filed: Jul. 22, 1991

[51] Int. Cl.⁵ .............................................. B23C 1/16
[52] U.S. Cl. ...................................................... 409/81
[58] Field of Search ................. 409/81, 82, 83; 76/110

[56] References Cited

U.S. PATENT DOCUMENTS 1,656,295  1/1928  Schechter ........................... 409/81
1,848,046  3/1932  Caron .................................. 409/81

FOREIGN PATENT DOCUMENTS 2356476  1/1978  France ................................. 76/110
2448404  10/1980 France ................................. 409/81

*Primary Examiner*—William Briggs
*Attorney, Agent, or Firm*—Mark T. Basseches; Paula T. Basseches

[57] ABSTRACT

A key duplicating device includes a movable carriage having a key tracer and a key cutter in mutually spaced relation, the carriage having a drive assembly for shifting the carriage relative to a pair of turrets for holding a key to be duplicated at a tracing station and a key blank to be cut at a cutting station. The device is characterized by each of the turrets including a pair of vises moveably mounted relative to the frame and detented whereby one vise of each turret is aligned at a respective cutting or tracing station and the other vise is displaced from such stations whereby the other vise may be loaded with a key and key blank while the machine is cutting and tracing the blank and key located at the respective cutting and tracing stations.

4 Claims, 2 Drawing Sheets

HIGH PRODUCTIVITY KEY CUTTING MACHINE

BACKGROUND AND FIELD OF THE INVENTION

The present invention is directed to a key duplicating machine of the type which traces the bitting of a key and causes the tracing movements to effect equivalent movements of a cutting wheel aligned with a key blank, whereby the pattern of the cut key is replicated in the blank.

PRIOR ART

Numerous forms of key duplicating machines are in current use. In general, such devices comprise a pair of vises for holding a key and a key blank in mutually spaced relation. The cutting apparatus comprises a tracer adapted to scan the already cut key and a cutting wheel for cutting or milling the blank, the tracer and cutter wheel being spaced in accordance with the spacing of the vises for holding the key and key blank. The cutter and tracer members are moved relative to the key blank and key, either manually or by a drive mechanism. In certain devices, devices holding the key and key blank, are moved as a unit relative to a stationary tracer and cutter mechanism, whereas in other known machines the vises remain stationary and the cutter and tracer are mounted on a carriage which moves as a unit, the carriage being shifted by motorized drive mechanisms.

U.S. Pat. No. 3,945,298 discloses a cutter employing stationary key and key blank vises and a movable cutter and tracer assembly.

U.S. Pat. No. 3,602,092 discloses a key cutter having vises which automatically align the key and key blank in proper position for the cutting operation before full clamping takes place.

U.S. Pat. No. 4,023,464 and French patent 2,448,405 disclose key cutting machines for simultaneously cutting two blanks at a time.

U.S. Pat. No. 4,780,032 discloses a key cutter capable of cutting blanks from a template or by a code.

SUMMARY OF THE INVENTION

The present invention may be summarized as directed to a key cutting apparatus which provides for a high productivity factor by enabling the operator to load additional blanks and/or keys to be cut during the time period when the apparatus is actually effecting a duplicating operation.

More particularly, the invention is directed to a key duplicating machine which is essentially conventional in its cutting and tracing operation, but which is characterized by the vises for holding the key and key blank being mounted on turrets, each of which turret includes two or more vises. The turrets are indexed such that when one vise of a turret is in active position (either cutting or tracing), one or more of the vises mounted on the respective turrets are displaced from the cutting and tracing stations. The cutting apparatus which is of a type known per se and incorporates a movable carriage on which is mounted the tracer and cutter mechanism is shifted relative to the stationary turrets. By this arrangement, the operator is enabled, during a duplicating operation, to mount a second key and key blank in the turrets of the tracing and cutting stations respectively.

By this means, at the conclusion of a duplicating cycle, the two turrets may be rotated to place a second key and a second key blank at the tracing and cutting stations. During the renewed duplicating cycle, the key and key blank cut during the preceding cutting cycle may be removed from the respective vises and a second key and key blank mounted in the respective vises of turrets which are in inactive position, i.e. spaced away from the tracing and cutting stations. In this manner, the operators time is efficiently employed.

It is accordingly an object of the invention to provide a high productivity key duplicating apparatus characterized in that the vises for holding the key and key blank are mounted on respective turrets and each turret includes two or more such vises, one vise of each turret being in an active position and at least one other vise of each turret being disposed at an inactive position subject to the loading of a key and key blank without interference with the currently effected duplicating operation.

DETAILED DESCRIPTION OF DRAWINGS

Since the specific details of various mechanisms for moving a key cutter and tracer relative to a stationary pair of vises through a duplicating cycle are known per se, i.e. from U.S. Pat. No. 3,945,298, and since the specifics of such mechanism forms no part of the instant invention the same is schematically illustrated and described.

Figure 1:
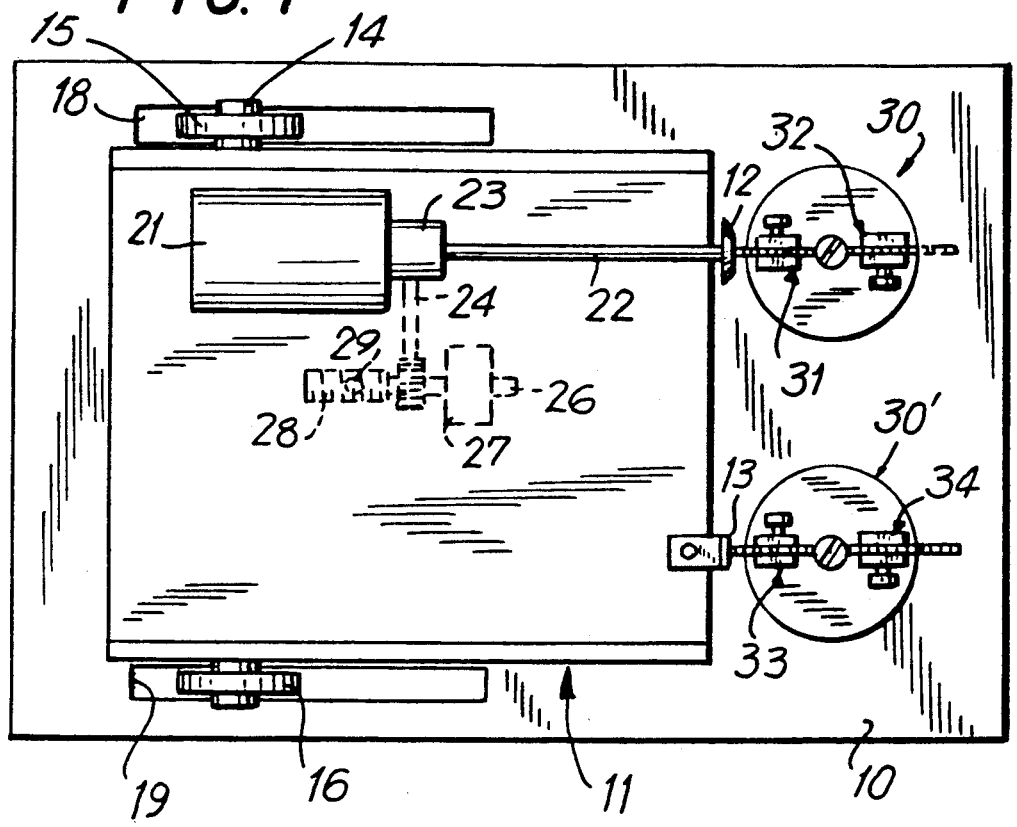
FIG. 1 is a schematic plan view of a key duplicating device in accordance with the invention.
Figure 2:
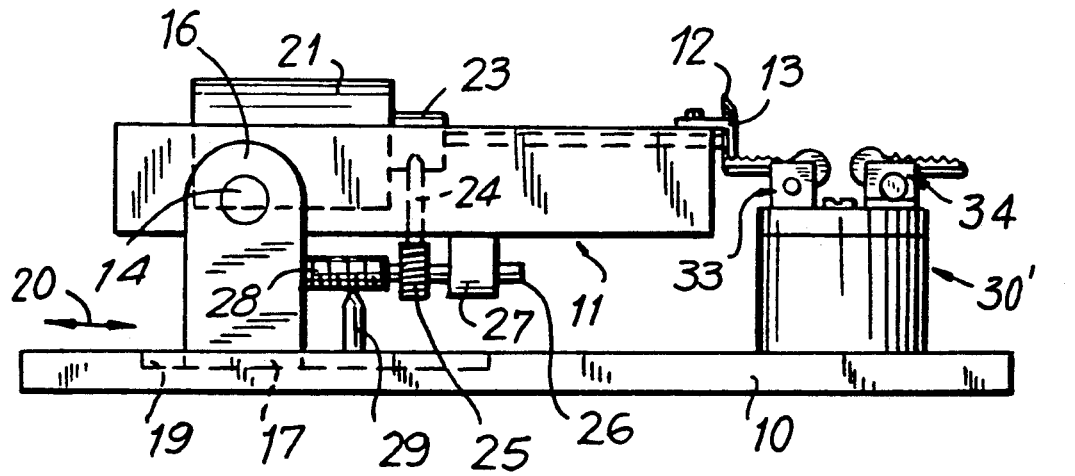
FIG. 2 is a side elevational view of the device of FIG. 1.

Referring now to FIG. 1, the duplicating machine includes a base or frame 10 on which is moveably mounted the cutting and tracing carriage assembly 11. The carriage assembly 11 includes a cutter wheel 12 and a tracer 13. The carriage includes a laterally directed, horizontally disposed trunion 14, the distal ends of which are pivotally mounted to a pair of spaced parallel standards 15,16. The lowermost ends 17 of standards 15,16 are slideably mounted within parallel tracks 18,19 formed in base 10, whereby the carriage assembly 11 is reciprocally moveably mounted in a horizontal direction (see arrow 20.

A drive and cutter motor 21 is mounted on the carriage assembly 11 and includes a drive shaft 22 in driving connection with cutter wheel 12. The drive shaft 22 in addition drives speed reduction 23, which via power take-off shaft 24 drives worm gear 25 fixed to drive shaft 26 rotatably mounted in bearing 27 on the undersurface of the carriage assembly 11. The shaft includes a screw member 28 which meshes with fixed stylus 29 supported on frame 10.

When the motor 21 is energized the carriage 11 will be shifted toward the vises 30 and 31', which hold the key blank and key respectively, as a result of rotation of shaft 26 and the interaction of screw 28 and stylus 29. The device is provided with limit switch means (not shown), which reverse the direction of rotation of the motor 21 after a cutting cycle is completed causing a reverse rotation of shaft 26 and a rearward movement of the carriage assembly 11 away from turrets 30 and 30'. The operation of the cutting device as thus far described is entirely conventional, it being understood that the eccentric weight of the carriage assembly 11 will cause the forward edge of the carriage to be urged downwardly, whereby the sharpened undersurface of stylus 13 will scan the bitting of a key held in a vise of turret assembly 30' and the cutter member 12 will move upwardly and downwardly to effect a cut of a key held in the vise of turret assembly 30 in accordance with the resultant upward and downward movements of the carriage.

As will be readily recognized by those skilled in the art any of a multitude of known means providing for a movable carriage, including a cutter and stylus, may be substituted for the generically described apparatus, the advance of the instant invention residing in the combination of turret assemblies 30,30' with the cutter and tracer assembly.

As best seen in FIG. 1, the turret assemblies 30 and 30' each include two vise members 31,32, and 33,34 respectively. In FIG. 1 the vise member 31 is shown disposed at a cutting station adjacent the cutter wheel 12 and vise 33 for holding the cut key is disposed at a tracing station adjacent the tracer member 13.

Since the turrets 30 and 30' are identical in structure a description of one will suffice.

Figure 3:
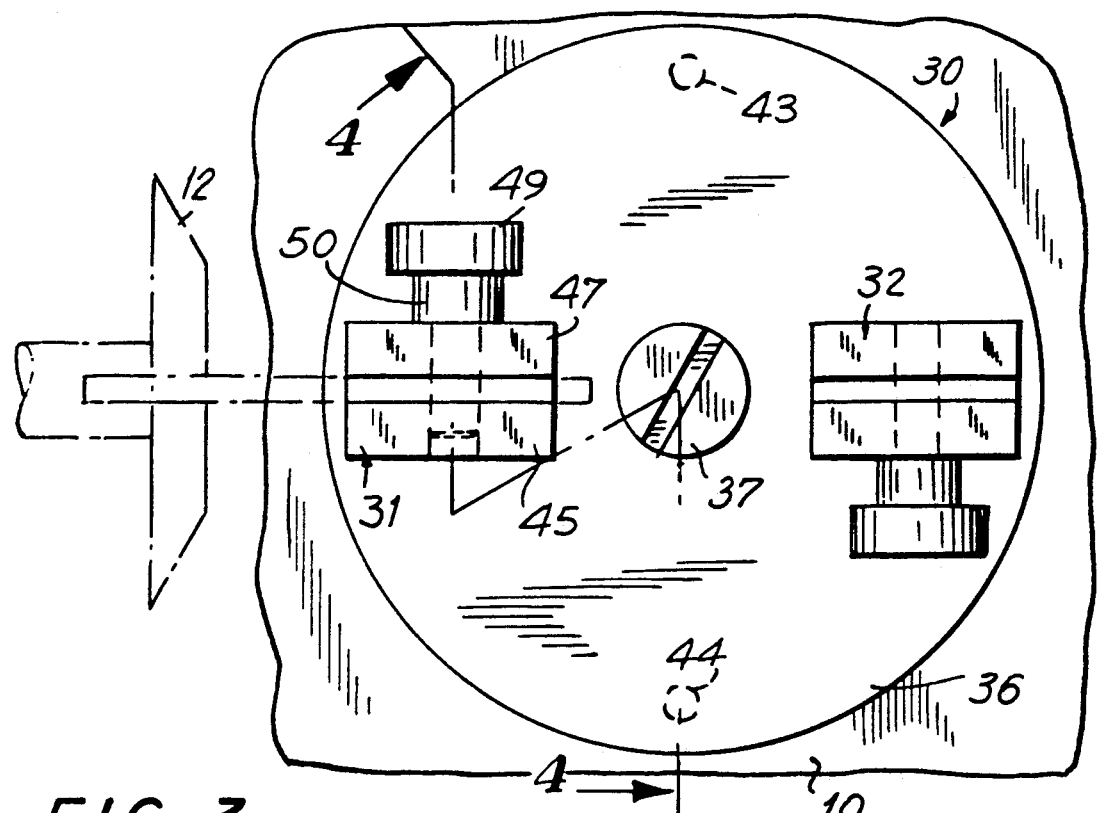
FIG. 3 is a magnified plan view of a turret apparatus, taken in the direction of the arrows 3—3 of FIG. 2.
Figure 4:
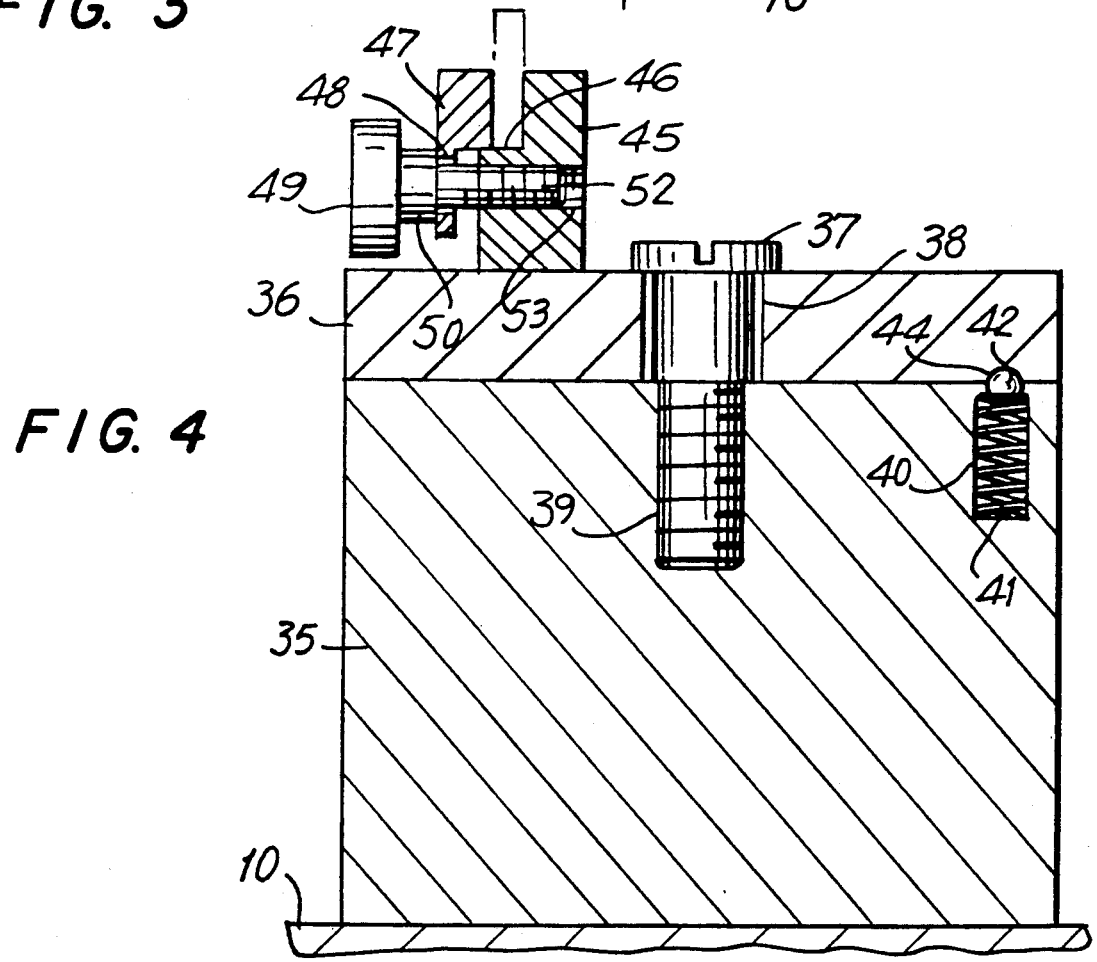
FIG. 4 is a vertical sectional view of the turret of FIG. 3, taken on the discontinuous section line 4—4 of FIG. 3.

Referring now to FIGS. 3 and 4, turrets, e.g. 30, include a base portion 35 fixed to the base member 10 and a turntable 36 rotatably mounted on base portion 35 by mounting bolt 37 extending through central aperture 38 formed in turntable 36 and threaded into complemental receiver aperture 39 in the base portion 35.

The base 35 includes a vertically directed blind bore 40, wherein is mounted a spring 41 which upwardly biases a detent ball 42. The turntable 36 includes a pair of downwardly open detent sockets 43,44 equally spaced from the pivot axis of bolt 37.

As will be understood from the preceding description the ball 42 will enter either of detent sockets 43 or 44 depending upon the rotated position of turntable 36, whereby one or the other of the vise members 31 or 32 will be locked in the active position adjacent the cutter wheel 12.

The vise mechanisms are known per se and include a fixed jaw 45 mounted to the turntable 36, the jaw 45 including a support ledge 46 forming a reference support for the base of the key blank. The vise members include a movable jaw 47 having a throughgoing aperture 48 through which passes tightening thumb screw 49. Thumb screw 49 includes a boss 50 adjacent movable jaw 47 and a threaded shank 52 engaged in threaded aperture 53 in fixed jaw 45.

As will be apparent from the foregoing description, a first key to be duplicated may be mounted in vise 33 of turret 30' and a first blank may be mounted in vise 31 of turret 30. Since the vises 32 and 34 are remote from the cutter wheel and stylus, a key blank and key may be safely mounted in vises 32 and 34 respectively during a cutting cycle. After a blank held in vise 31 has been cut, the turntables 36 of turrets 30 and 30' may be rotated to present a second blank and a second key in cutting and tracing positions adjacent cutter 12 and tracer 13 respectively. The apparatus may then be energized through a second cutting cycle and simultaneously the previously traced key and the newly cut blank removed from the respective vises, which may then be reloaded.

While the turrets of the illustrated embodiment have been disclosed to incorporate two vises each, it will be readily recognized that three or more pairs of vises may be included on the respective turntables 36.

From the foregoing, it will be appreciated that there is disclosed in accordance with the invention a high productivity key duplicating mechanism characterized in that the services of the locksmith may be efficiently employed since there is no "down time", due to the ability of the locksmith to load key blanks and keys in the inoperative vises while a different blank and key are mounted in the operative vises.

The operation of the device is in contrast to conventional key cutting machines, wherein the cutting operation must be interrupted for removal of the specimen key and blank and reloading of a second key and blank.

I claim:

1. In a key cutter device having a frame, a carriage moveably mounted on said frame, a key cutter and a key tracer supported on said carriage in predetermined spaced relation, first and second vise means mounted on said frame for holding a cut key and a key blank at a tracing station and a cutting station respectively, said first and second vise means being spaced to correspond to the spacing of said cutter and said tracer and drive means interposed between said carriage and frame for shifting said carriage relative to said vise means along a path whereby said tracer follows the bitting contours of a key held in said second vise means, and said cutter forms concomitant contour on said blank in said first vise means, the improvement wherein said second vise means comprises a turret having a first pair of blank clamp jaws and a second pair of blank clamp jaws in spaced relation to said first pair of jaws, first and second jaw activating means on said turret for independently activating said first and said second pairs of jaws, pivot means interposed between said turret and said frame for supporting said turret for pivotal movement about a pivot axis equidistant from said first and second pairs of jaws, said turret being pivotal about said pivot axis to selectively align said first and second pairs of jaws at said cutting station.

2. A key cutter device in accordance with claim 1, wherein said first vise means comprises a turret having a first pair of key clamp jaws and a second pair of key clamp jaws in spaced relation to said first pair, first and second jaw activating means on said turret or said first vise means for independently activating said first and said second pairs of jaws, pivot means interposed between said turret and said frame for supporting said turret for pivotal movement about a pivot axis equidistant from said first and second pairs of jaws, said turret being pivotal about said pivot means to selectively align said first and second pairs of key clamp jaws at said tracing station.

3. A key cutter device in accordance with claim 1, and including detent means interposed between said turret and said frame for selectively locking said turret against movement relative to said frame with said first or said second pair of blank clamp jaws disposed at said cutting station.

4. In a key cutter device having a frame, a carriage moveably mounted on said frame, a key cutter and a key tracer supported on said carriage in predetermined spaced relation, first and second stationary vise means mounted on said frame for holding a .cut key and a key blank at a tracing station and a cutting station respectively, said first and second vise means being spaced to correspond to the spacing of said cutter and tracer, and drive means interposed between said carriage and frame for shifting said carriage relative to said vise means along a path whereby said tracer follows the bitting of the contours of a key held in said second vise means and said cutter forms a concomitant contour on said blank in said first vise means, the improvement wherein said first and second vise means each comprise first and second mutually spaced vises, detent means interposed between said frame and vise means for selectively locking one said vise of said vise means at a respective cutting or tracing station and holding the other said vise of said vise means at a position displaced from said cutting or tracing station.

* * * * *